United States Patent
Hayashi et al.

(10) Patent No.: US 10,859,423 B2
(45) Date of Patent: Dec. 8, 2020

(54) LIQUID SENSOR AND TUBE HOLDING MEMBER OF LIQUID SENSOR

(71) Applicant: PANASONIC INDUSTRIAL DEVICES SUNX CO., LTD., Aichi (JP)

(72) Inventors: Kazuhiko Hayashi, Aichi (JP); Takumi Terazawa, Aichi (JP); Hironao Kitanaka, Aichi (JP)

(73) Assignee: PANASONIC INDUSTRIAL DEVICES SUNX CO., LTD., Aichi (JP)

(*) Notice: Subject to any disclaimer, the term of this patent is extended or adjusted under 35 U.S.C. 154(b) by 52 days.

(21) Appl. No.: 16/090,793

(22) PCT Filed: Apr. 20, 2017

(86) PCT No.: PCT/JP2017/015914
§ 371 (c)(1),
(2) Date: Oct. 2, 2018

(87) PCT Pub. No.: WO2017/208661
PCT Pub. Date: Dec. 7, 2017

(65) Prior Publication Data
US 2019/0120681 A1   Apr. 25, 2019

(30) Foreign Application Priority Data
May 31, 2016   (JP) .................. 2016-108479

(51) Int. Cl.
*G01F 23/292*   (2006.01)
*G01N 21/17*   (2006.01)
*G01P 13/00*   (2006.01)

(52) U.S. Cl.
CPC ........... *G01F 23/292* (2013.01); *G01N 21/17* (2013.01); *G01P 13/00* (2013.01)

(58) Field of Classification Search
CPC .................................................. G01F 23/292
See application file for complete search history.

(56) References Cited

U.S. PATENT DOCUMENTS

| 2002/0117850 A1* | 8/2002 | Wood ................. B60H 1/00571 |
| | | 285/124.1 |
| 2004/0061332 A1* | 4/2004 | Takayanagi ......... F16L 37/0847 |
| | | 285/319 |
| 2012/0012218 A1* | 1/2012 | Sabadie .................. B64C 1/066 |
| | | 138/106 |

FOREIGN PATENT DOCUMENTS

| EP | 1 722 204 A1 | 11/2006 |
| JP | H08-293234 A | 11/1996 |

(Continued)

OTHER PUBLICATIONS

International Search Report issued in PCT/JP2017/015914; dated May 23, 2017.

(Continued)

*Primary Examiner* — Harshad R Patel
*Assistant Examiner* — Alex T Devito
(74) *Attorney, Agent, or Firm* — Studebaker & Brackett PC

(57) ABSTRACT

A liquid sensor is configured to detect presence or absence of a liquid in a tube having a light-transmitting property. The liquid sensor includes a main body case including an elastic piece configured to hold the tube such that the tube is allowed to be inserted therein and extracted therefrom in a direction perpendicular to a longitudinal direction of the tube, a light projecting unit configured to irradiate the tube with detection light, and a light receiving unit configured to receive the detection light that has passed through the tube. A holding member configured to cover the tube in an insertion and extraction direction of the tube is attachable to and detachable from the main body case only in a direction (Continued)

that is not identical with the insertion and extraction direction of the tube.

7 Claims, 9 Drawing Sheets

(56) References Cited

FOREIGN PATENT DOCUMENTS

| JP | 2004-301707 A | 10/2004 |
|---|---|---|
| JP | 2008-164440 A | 7/2008 |
| JP | 2012-063328 A | 3/2012 |
| JP | 2015-137908 A | 7/2015 |

OTHER PUBLICATIONS

Written Opinion issued in PCT/JP2017/015914; dated May 23, 2017.

The extended European search report issued by the European Patent Office dated Jan. 17, 2020, which corresponds to European Patent Application No. 17806221.2-1001 and is related to U.S. Appl. No. 16/090,793.

* cited by examiner

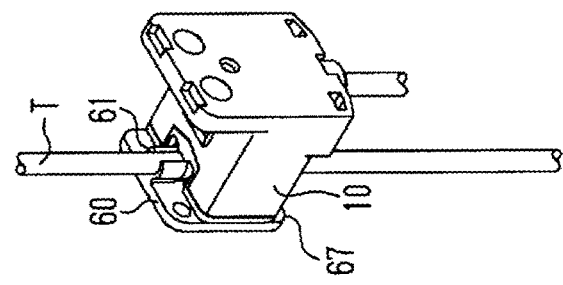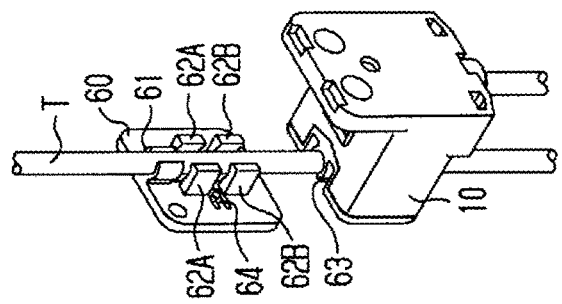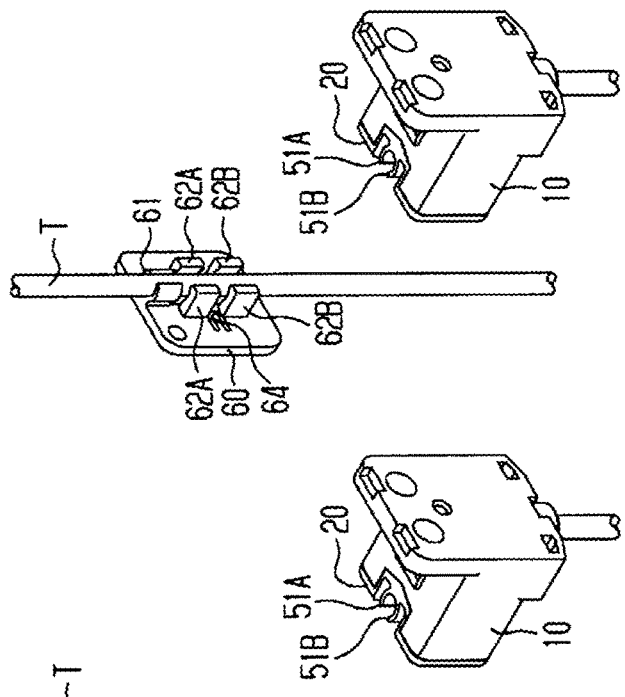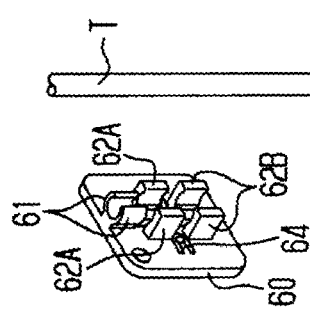

LIQUID SENSOR AND TUBE HOLDING MEMBER OF LIQUID SENSOR

TECHNICAL FIELD

The present invention relates to a liquid sensor for optically detecting presence or absence of a liquid in a tube and a tube holding member of a liquid sensor.

BACKGROUND ART

As one type of a liquid sensor, there is a sensor which is used as detection means of a liquid exhaustion detecting device that can confirm liquid exhaustion of a transported reagent by detecting presence or absence of a liquid in a tube in a device that transports the liquid, such as a reagent, via a tube.

In such a liquid sensor, a tube having a light-transmitting property is held by the liquid sensor, and light emitted from a light emitting element incorporated in the liquid sensor toward the tube is received by a light receiving element. Then, since a refracted state of the light varies depending on presence or absence of the liquid in the tube, presence or absence of the liquid in the tube is detected based on a light receiving amount of the light receiving element.

RELATED ART DOCUMENT(S)

Patent Document(s)

Patent Document 1: JP-A-2015-137908

SUMMARY OF THE INVENTION

Problem to be Solved by the Invention

In the liquid sensor as described above, in order to stably detect presence or absence of the liquid in the tube, it is necessary to stably hold the tube at a predetermined holding position of the liquid sensor.

The liquid sensor is provided with a holding unit that holds the tube by elastically fitting the tube in order to make the tube easily attachable to and detachable from the holding position. However, when pulling force that exceeds a holding force by the holding unit acts on the tube, since the tube comes off from the holding unit, presence or absence of the liquid in the tube cannot be detected.

Patent Document 1 discloses a pipe liquid detection sensor in which a pipe is held between a main body and a plate material by tightening one screw. However, in order to fix the sensor to the pipe, tightening work of the screw is necessary, and thus, attaching work is complicated.

The invention has been made in view of the circumstances, and an object thereof is to provide a liquid sensor capable of easily and stably holding a tube at a predetermined holding position.

Means for Solving the Invention

In order to solve the above-described problem, there is provided a liquid sensor configured to detect presence or absence of a liquid in a tube having a light-transmitting property, the liquid sensor including: a main body case including: an elastic piece configured to hold the tube such that the tube is allowed to be inserted therein and extracted therefrom in a direction perpendicular to a longitudinal direction of the tube; a light projecting unit configured to irradiate the tube with detection light; and a light receiving unit configured to receive the detection light that has passed through the tube, wherein a holding member configured to cover the tube in an insertion and extraction direction of the tube is attachable to and detachable from the main body case only in a direction that is not identical with the insertion and extraction direction.

Accordingly, even when pulling force acts on the tube, the tube does not come off in the insertion and extraction direction from the main body case.

In the liquid sensor, it is preferable that the elastic piece allows the tube to be elastically inserting therein and extracting therefrom in the direction perpendicular to the longitudinal direction of the tube, and forms a fitting recess portion between the main body case and the elastic piece, and the holding member includes a fitting piece that is capable of attaching and detaching the holding member to and from the fitting recess portion only in a direction along the longitudinal direction of the tube.

Accordingly, the tube can be held in the main body case without using screws, and the holding member prevents the tube from coming off from the elastic piece.

In the liquid sensor, it is preferable that the fitting recess portion has a width of a depth portion in the insertion and extraction direction of the tube wider than that of an intermediate portion, and a lateral cross-sectional shape of the fitting piece is a shape that is the same as a sectional shape of the fitting recess portion, whereby insertion and extraction is allowed only in the direction along the longitudinal direction of the tube.

Accordingly, the holding member does not come off in the insertion and extraction direction of the tube to the elastic piece due to the fitting piece of the holding member fitted to the fitting recess portion on the main body case side.

In the liquid sensor, it is preferable that a holding piece configured to elastically hold the tube is provided in the holding member.

Accordingly, even when the holding member is detached from the main body case, the holding member is held in the tube.

In the liquid sensor, it is preferable that the holding member includes positioning means for being elastically engaged with the main body case to position the holding member in the longitudinal direction of the tube.

Accordingly, the holding member is positioned with respect to the main body case in the longitudinal direction of the tube.

In the liquid sensor, it is preferable that the holding member includes a finger hook portion that protrudes to one side than the main body case in a state in which the holding member is positioned in the main body case.

Accordingly, it is easy to remove the holding member from the main body case.

In the liquid sensor, it is preferable that the holding member has a lateral width so as not to protrude from a side surface of the main body case.

Accordingly, the holding member attached to the main body case is hard to be hooked by the surrounding articles.

In the liquid sensor, it is preferable that a surface of the holding member includes a projection portion configured to increase a friction coefficient of the surface.

Accordingly, it is easy to perform a sliding operation of the holding member with respect to the main body case.

In order to solve the above-described problem, there is provided a tube holding member of a liquid sensor configured to detect presence or absence of a liquid in a tube having a light-transmitting property, the tube holding member including: a holding member configured to hold the tube that is held at a detection position to be insertable to and extractable from a main body case of the liquid sensor, wherein the holding member is attachable to and detachable from the main body case only in a direction that is not identical with the insertion and extraction direction of the tube with respect to the main body case.

Accordingly, even when pulling force acts on the tube, the tube does not come off from the main body case.

Advantage of the Invention

According to the liquid sensor of the present invention, it is possible to easily and stably hold the tube at a predetermined holding position.

BRIEF DESCRIPTION OF THE DRAWINGS

FIGS. 12(a) to 12(d) are perspective views illustrating an attaching procedure of the holding member.

MODE FOR CARRYING OUT THE INVENTION

Hereinafter, one embodiment of a liquid sensor will be described with reference to the drawings.

Figure 1:
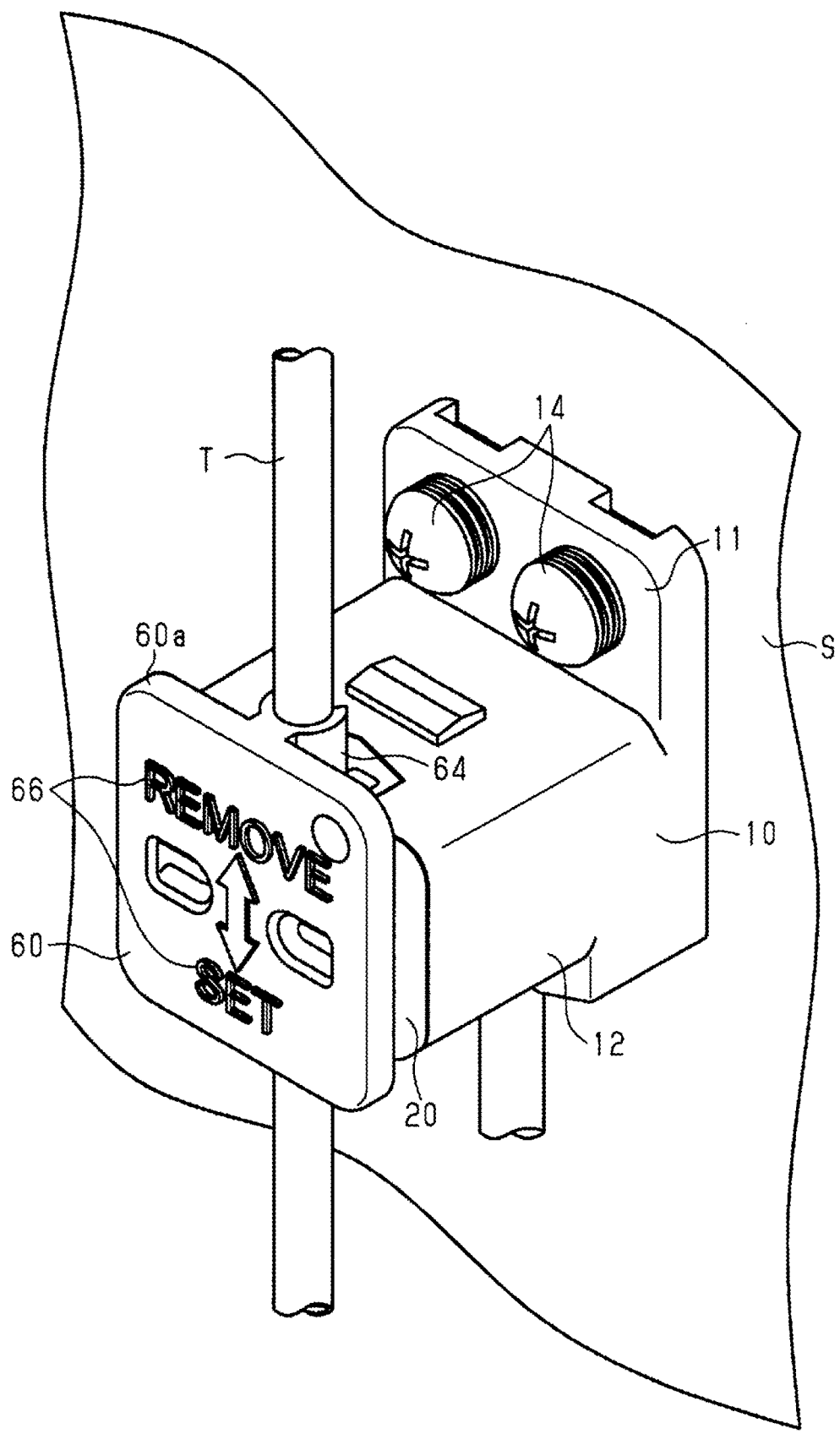
FIG. 1 is a perspective view illustrating a liquid sensor.

The liquid sensor illustrated in FIG. 1 has a function of holding a tube through which a liquid, such as a reagent, is transported and optically detecting presence or absence of the liquid in the tube.

Figure 2:
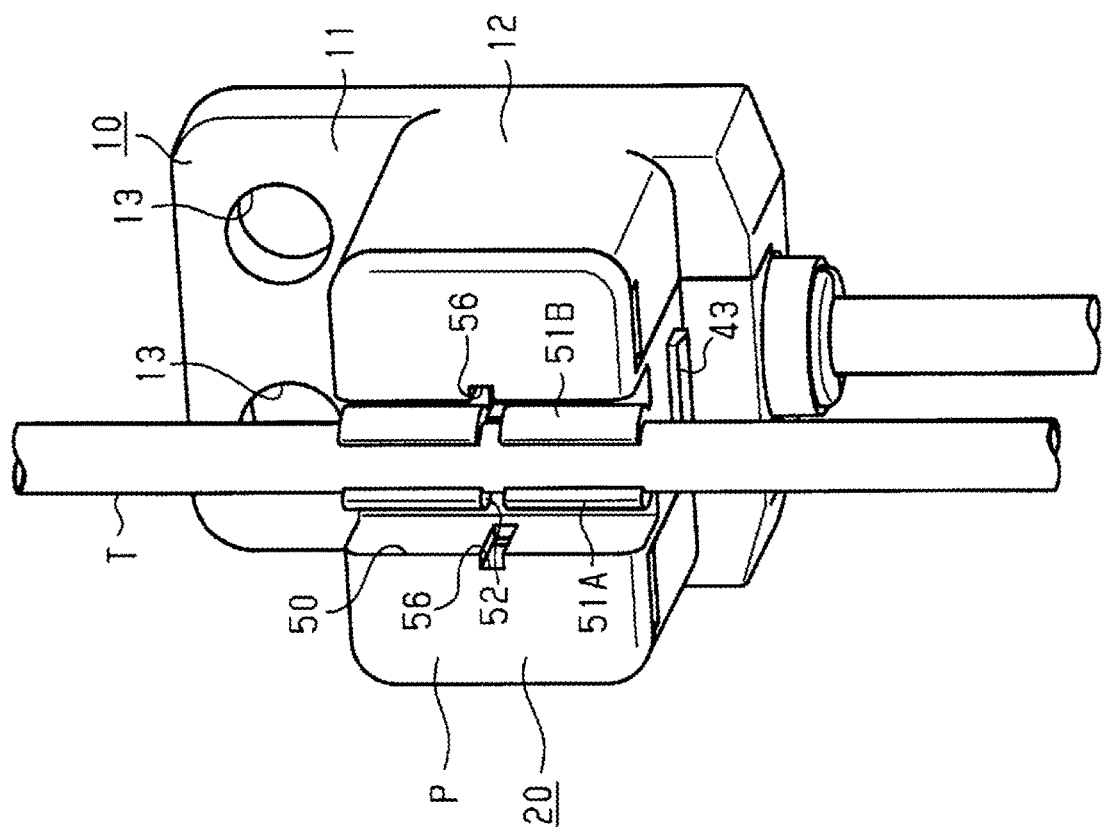
FIG. 2 is a perspective view illustrating a liquid sensor in a state where a holding member is removed.
Figure 2:
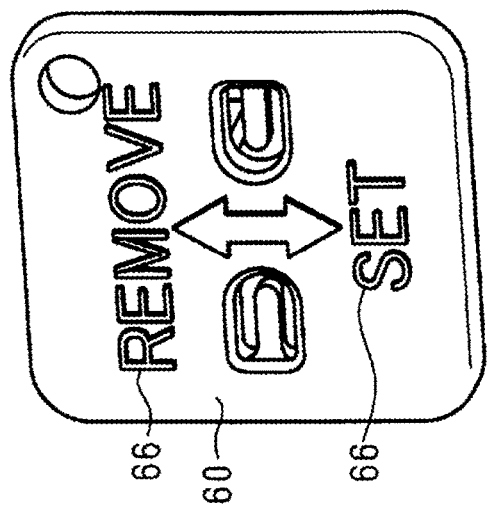

As illustrated in FIG. 2, an exterior of the liquid sensor of the embodiment includes a main body case 10 and a cover material 20.

The main body case 10 is made of, for example, a hard resin, and includes a flat plate portion 11 and a tubular portion 12 that protrudes from the flat plate portion 11. At an end portion of the flat plate portion 11, attachment holes 13 are formed at two locations. As illustrated in FIG. 1, the main body case 10 is fixed to a predetermined attachment surface S by screws 14 inserted through the attachment holes 13.

The cover member 20 is fitted to the tubular portion 12 of the main body case 10. The front surface of the cover member 20 is exposed on the front surface side of the liquid sensor in a state of covering an opening end of the tubular portion 12 and can hold a tube T having a light-transmitting property as a measurement target of the liquid sensor. In addition, the attachment surface S is usually in a perpendicular direction and a holding direction of the tube T is parallel to the attachment surface S.

Figure 3:
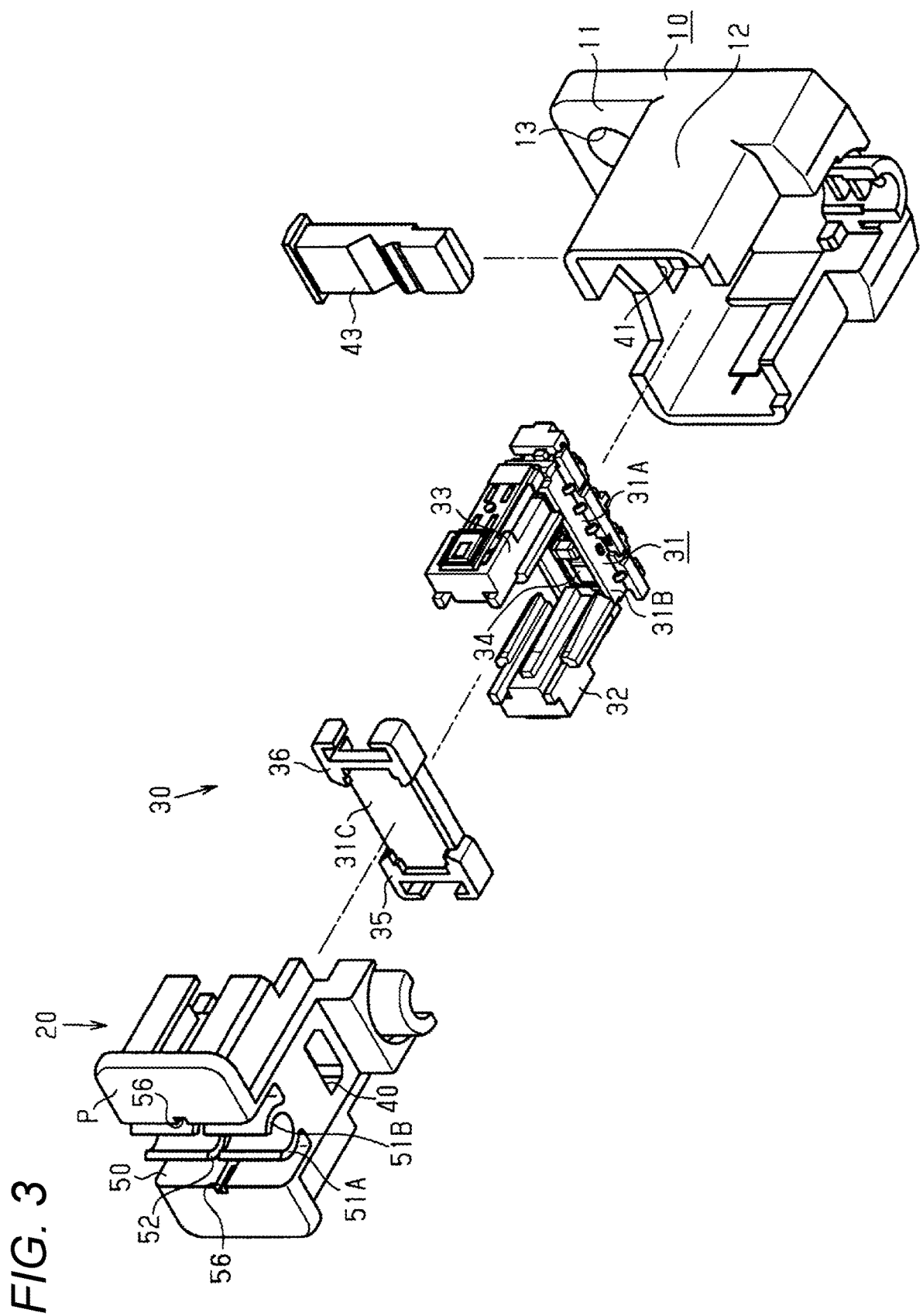
FIG. 3 is an exploded perspective view illustrating a liquid sensor.

As illustrated in FIG. 3, a sensor unit 30 that detects presence or absence of the liquid in the tube T is accommodated in the tubular portion 12 of the main body case 10. The sensor unit 30 includes a board frame 31, a light projecting frame 32, and a light receiving frame 33. The board frame 31 extends to be elongated in one direction. The light projecting frame 32 and the light receiving frame 33 perpendicularly stands in the same direction from one end and the other end of a longitudinal direction of the board frame 31, respectively.

The board frame 31 includes a bottom frame portion 31A, a side frame portion 31B, and a cover frame portion 31C. In the bottom frame portion 31A, a circuit element 34 that controls various operations in the liquid sensor is mounted. The side frame portion 31B has a rectangular frame shape and surrounds the circuit element 34.

The cover frame portion 31C closes a mounting space of the circuit element 34 surrounded by the bottom frame portion 31A and the side frame portion 31B. In addition, the cover frame portion 31C extends to be elongated in one direction, and a first fitting portion 35 and a second fitting portion 36 are provided at one end and the other end of the longitudinal direction, respectively. The light projecting frame 32 and the light receiving frame 33 respectively fits into the first fitting portion 35 and the second fitting portion 36, and the light projecting frame 32 and the light receiving frame 33 are fixed to the board frame 31.

The cover member 20 is fitted so as to close the opening of the tubular portion 12 of the main body case 10 in a state where the sensor unit 30 is accommodated in the tubular portion 12 of the main body case 10. At this time, an insertion hole 40 formed in the cover member 20 and an insertion hole 41 formed in the main body case 10 are disposed so as to overlap each other. A positioning pin 43 is inserted from the outside of the main body case 10 into the overlapping insertion holes 40 and 41. The positioning pin 43 comes into contact with the cover frame portion 31C of the board frame 31 in the sensor unit 30 from above, and accordingly, the accommodation position of the sensor unit 30 in the tubular portion 12 of the main body case 10 is positioned.

Next, the configuration of the cover member 20 will be described.

Figure 4:
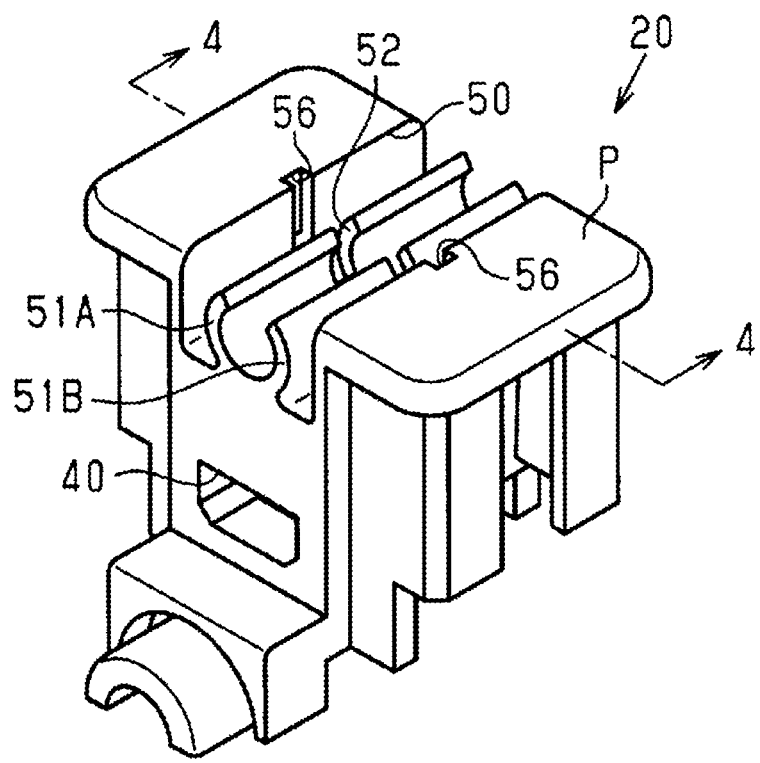
FIG. 4 is a perspective view illustrating a cover member.

As illustrated in FIG. 4, the cover member 20 is integrally formed of, for example, a black soft resin, and at the center position in the longitudinal direction of a top surface P having a substantially rectangular shape, a recessed groove 50 that extends linearly from one end to the other end of a lateral direction of the top surface P is formed. On the bottom surface of the recessed groove 50, a pair of elastic pieces 51A and 51B are formed in an arc shape and extend over the entire region in the longitudinal direction of the recessed groove 50.

Figure 5:
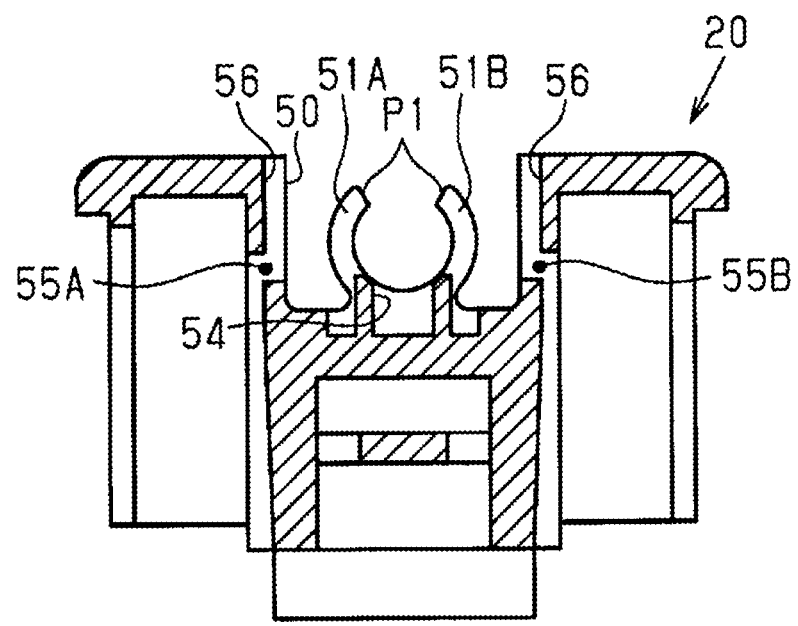
FIG. 5 is a sectional view taken along line 4-4 of FIG. 4.

As illustrated in FIG. 5, the elastic pieces 51A and 51B correspond to a remaining part obtained by cutting a part of a cylinder in the longitudinal direction, and a cutting range is in a range of approximately 60 degrees with respect to the center of the cylinder. In addition, the opening portion between the elastic pieces 51A and 51B is opened with a dimension smaller than the outer diameter of the tube T, and the tube T can be elastically inserted into and extracted from the opening portion in a space between the elastic pieces 51A and 51B.

At a tip end edge of the elastic pieces 51A and 51B, a first tapered surface P1 along a straight line that extends in a radial direction from the center of the curve of the elastic pieces 51A and 51B is formed. Therefore, while guiding the tube T on the first tapered surface P1, the tube T can be elastically fitted and inserted between the elastic pieces 51A and 51B.

A slit 52 that divides the elastic pieces 51A and 51B into two in the longitudinal direction is formed in the central portion of the longitudinal direction of the elastic pieces 51A and 51B. Furthermore, the slit 52 communicates with a recess portion 54 formed on the bottom surface of the recessed groove 50.

Figure 7:
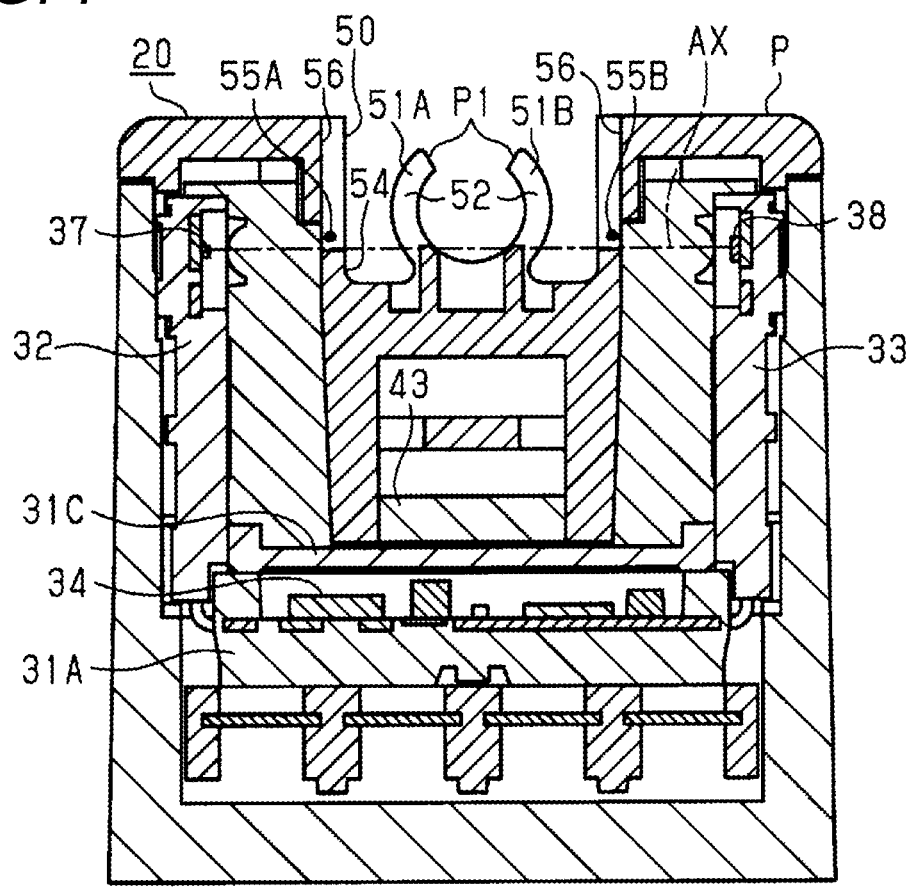
FIG. 7 is a sectional view illustrating the liquid sensor.

As illustrated in FIG. 7, a light projecting element 37 and a light receiving element 38 disposed on the light projecting frame 32 and the light receiving frame 33 are positioned on both sides of the slit 52 to oppose each other in a state where the cover member 20 is fitted to the main body case 10. In addition, on both sides of the slit 52, passing holes 55A and 55B are formed on the side surface of the recessed groove 50.

In addition, the detection light output from the light projecting element 37 is made to be incident on the light receiving element 38 from the passing hole 55A via the slit 52 and the passing hole 55B. In other words, the slit 52 is disposed on an optical axis AX of the detection light formed between the light projecting element 37 and the light receiving element 38.

Figure 6:
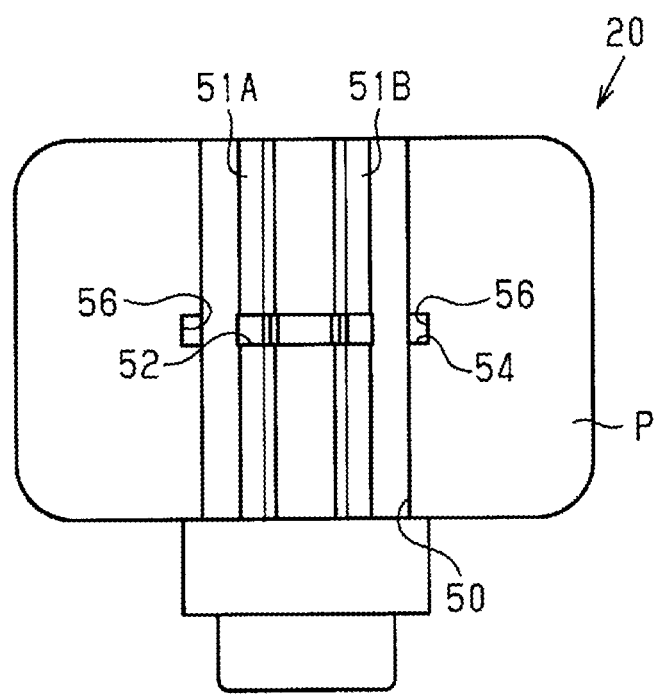
FIG. 6 is a plan view illustrating the cover member.

As illustrated in FIGS. 6 and 7, the passing holes 55A and 55B extend to the top surface P of the cover member 20 and form locking grooves 56.

Figure 8A:
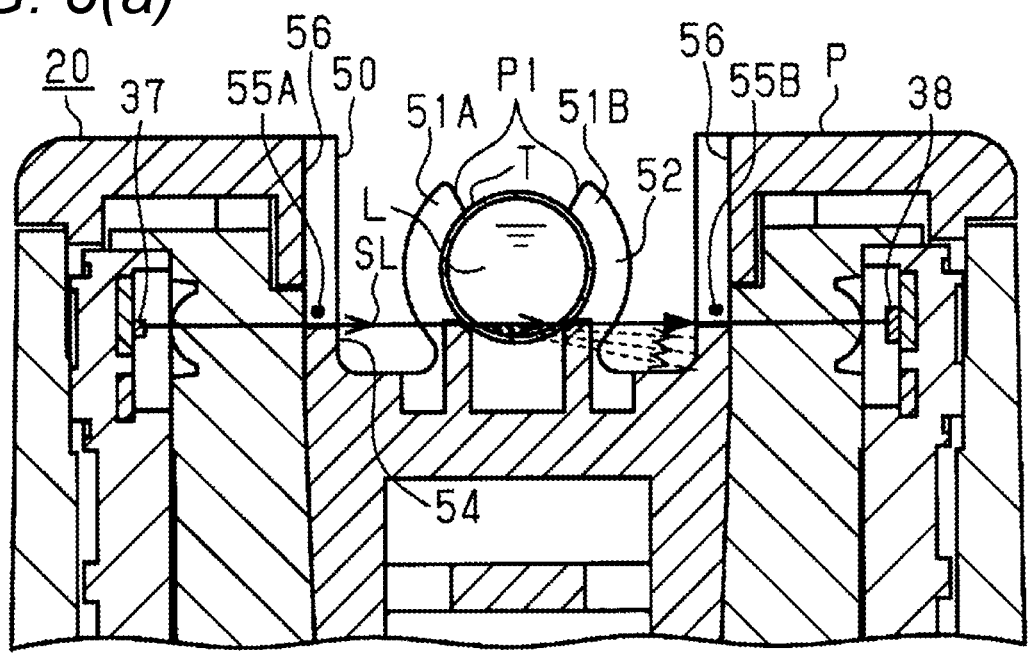
FIGS. 8(a) and 8(b) are explanatory views illustrating a detection operation of a liquid in a tube.
Figure 8B:
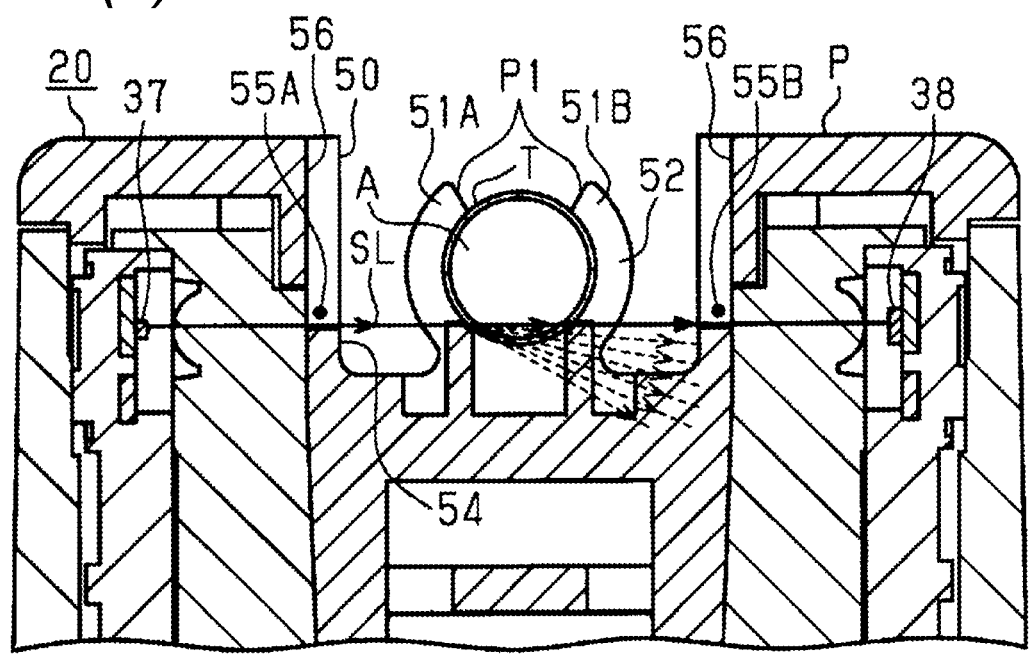

As illustrated in FIGS. 8(a) and 8(b), when a detection light SL is emitted from the light projecting element 37 in a state where the tube T is held by the elastic pieces 51A and 51B, the emitted detection light SL reaches the outer surface of the tube T via the slit 52 and further passes through the tube T, and after this, the light is received by the light receiving element 38.

At this time, a refracted state of the detection light SL changes in accordance with a difference between a refracting rate of a material of the tube T and a refracting rate of a medium inside the tube T.

As illustrated in FIG. 8(a), when the inside of the tube T is filled with a liquid L, the refracting rate of the liquid L is greater than the refracting rate of air A. Therefore, the difference in the refracting rate becomes relatively small. Therefore, among the detection light SL emitted from the light projecting element 37, a ratio of the detection light SL which is refracted on a boundary between the tube T and the liquid L and did not reach the light receiving element 38 becomes relatively small.

As illustrated in FIG. 8(b), when the inside of the tube T is filled with the air A by bubbles or the like, the refracting rate of the air A is greater than the refracting rate of the liquid L. Therefore, the difference in the refracting rate becomes relatively large. Therefore, among the detection light SL emitted from the light projecting element 37, the ratio of the detection light which is refracted on the boundary between the tube T and the liquid L and did not reach the light receiving element 38 becomes relatively large.

Here, in the present embodiment, the light receiving amount in the light receiving element 38 is compared with a predetermined threshold value, and when the light receiving amount is less than the predetermined threshold value, it is possible to determine that the inside of the tube T is filled with the air A. Specifically, the light receiving element 38 outputs a signal of a level that corresponds to the light receiving amount.

A detection circuit including the circuit element 34 mounted on the board frame 31 illustrated in FIG. 3 compares the level (for example, voltage value) of the signal output from the light receiving element 38 with a threshold value and outputs a detection signal that corresponds to the comparison result to an external device. By the detection signal, it is possible to determine whether the medium inside the tube T is the liquid L or the air A.

Figure 9:
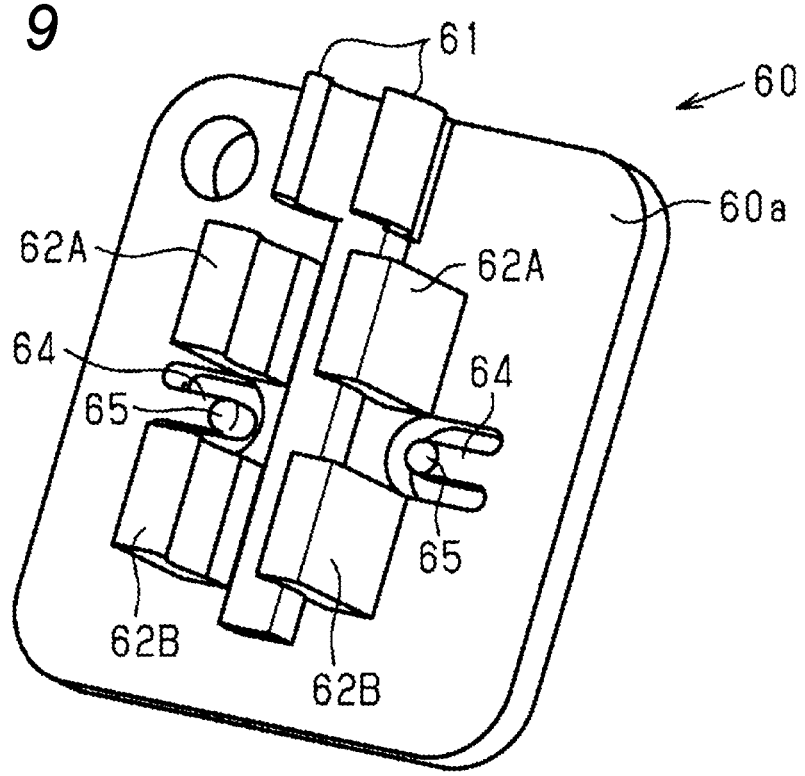
FIG. 9 is a perspective view illustrating a rear surface of the holding member.

As illustrated in FIG. 1, a holding member 60 for stably holding the tube T in a state of being fitted to the elastic pieces 51A and 51B is attached to the front surface of the main body case 10. The holding member 60 is molded with a synthetic resin, and as illustrated in FIG. 9, includes a rectangular plate-like flat plate portion 60a having a size that can substantially cover the front surface of the cover member 20.

On the rear surface of the flat plate portion 60a, a pair of holding pieces 61 capable of elastically fitting the tube T, and two pairs of fitting pieces 62A and 62B below the holding piece 61 are formed. The holding pieces 61 have a shape similar to the elastic pieces 51A and 51B formed on the cover member 20, and can elastically fit the tube T from the opening portion between the pair of holding pieces 61.

The center between each pair of the fitting pieces 62A and 62B which oppose each other and the center between the opposing holding pieces 61 are positioned on same straight line. In addition, between the fitting pieces 62A and 62B, a gap which is equal to or greater than the width of the slits 52 of the elastic pieces 51A and 51B of the cover member 20 is ensured.

Figure 10:
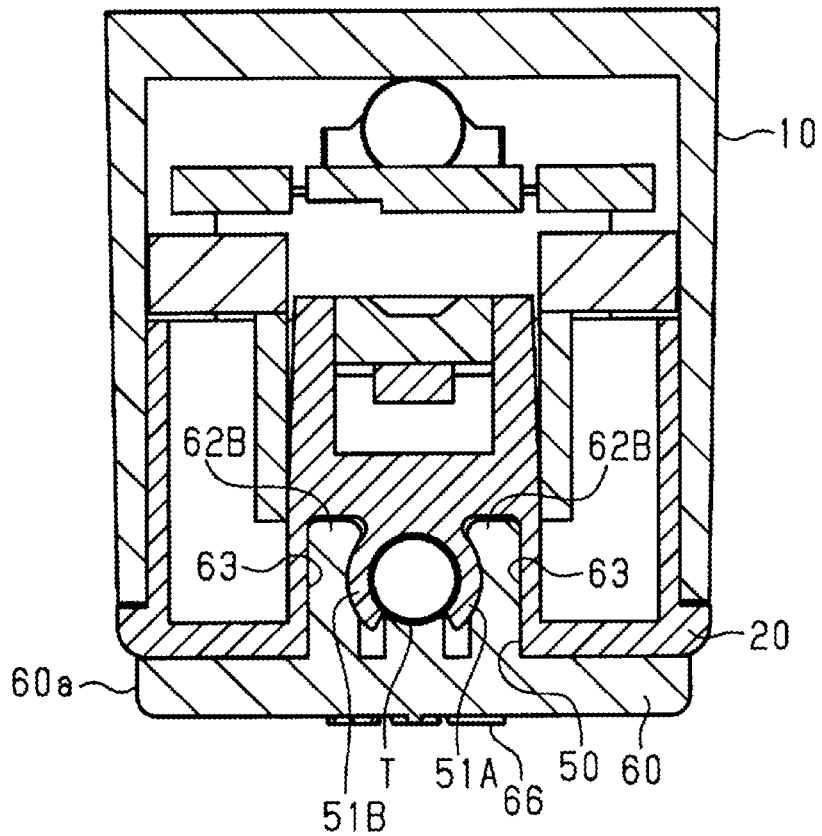
FIG. 10 is a sectional view illustrating an attached state of the holding member.

As illustrated in FIG. 10, the cross-sectional shape of the fitting pieces 62A and 62B is a shape that is the same as the fitting recess portion 63 formed between the side surface of the recessed groove 50 of the cover member 20 and the outer circumferential surface of the elastic pieces 51A and 51B.

In other words, since the outer surfaces of the elastic pieces 51A and 51B are curved in an arc shape, in the fitting recess portion 63, the width of the intermediate portion in the depth direction thereof is narrower than the width of the deepest portion. Therefore, in a state where the tube T is held between the elastic pieces 51A and 51B, since the bending in a direction in which the elastic pieces 51A and 51B approach each other is substantially not allowed, each of the fitting pieces 62A and 62B can be fitted and inserted into the fitting recess portion 63, for example, only from above.

Further, in a state where the tube T is held between the elastic pieces 51A and 51B, the fitting pieces 62A and 62B fitted to the fitting recess portion 63 does not come off from the front of the main body case 10, that is, in the direction perpendicular to the longitudinal direction of the tube T.

Elastic pieces 64 that extend from the side end side of the flat plate portion 60a toward the gap between the fitting pieces 62A and 62B are formed on the flat plate portion 60a. Hemispherical protrusion portions 65 that protrude toward the rear surface side of the flat plate portion 60a, that is, toward the cover member 20 side, are formed at the tip ends of the elastic pieces 64.

Figure 11:
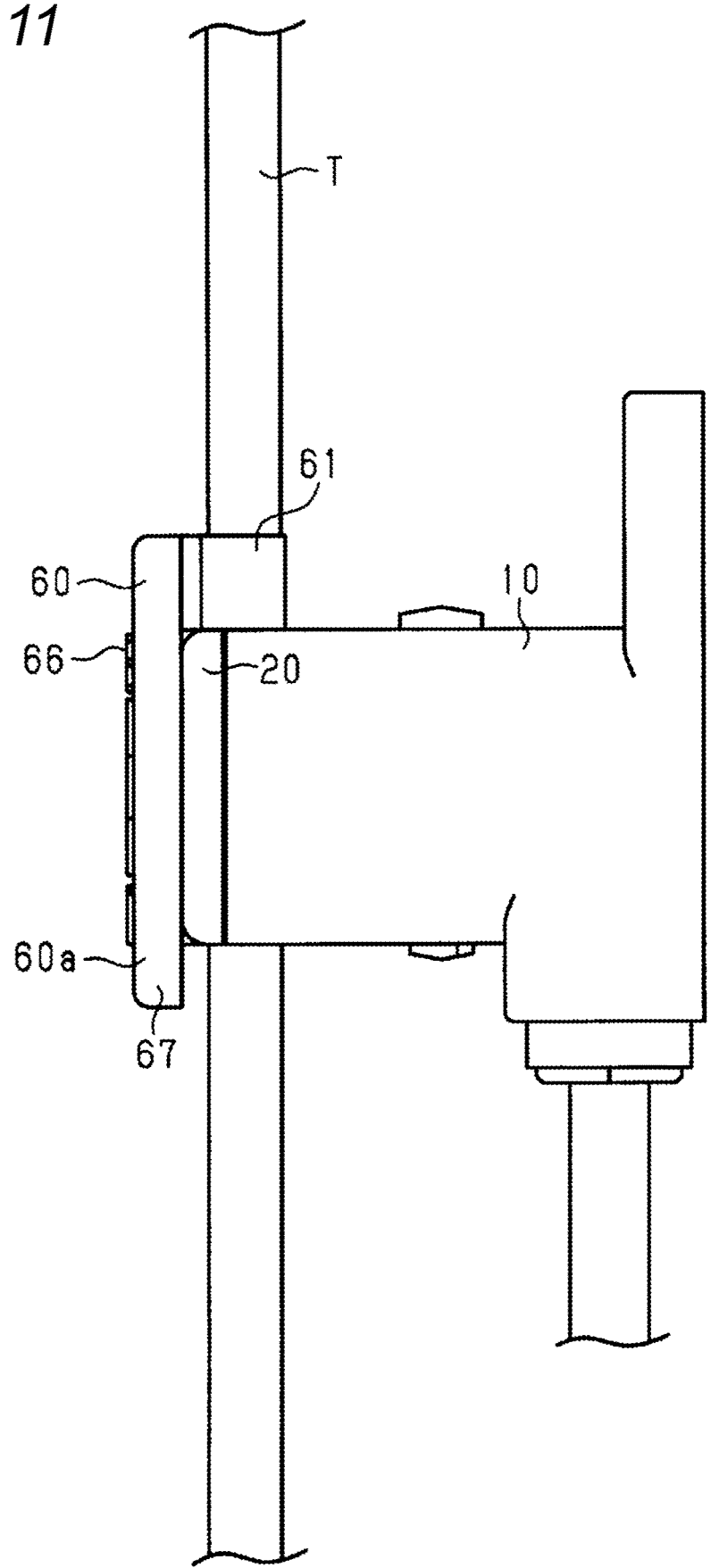
FIG. 11 is a side view illustrating the attached state of the holding member.

When the fitting pieces 62A and 62B of the holding member 60 are inserted into the fitting recess portion 63 from above, the protrusion portion 65 abuts against the top surface P on the side of the recessed groove 50 of the cover member 20, and the elastic piece 64 slides while bending. In addition, as illustrated in FIG. 11, when the holding piece 61 abuts against the elastic pieces 51A and 51B of the cover member 20, the protrusion portion 65 reaches the position of the locking groove 56 and is elastically engaged with the locking groove 56, and the holding member 60 is positioned in a vertical direction with respect to the cover member 20. In a state where the holding member 60 is positioned on the cover member 20, the gap between the fitting pieces 62A and 62B and the slits 52 of the elastic pieces 51A and 51B of the cover member 20 communicate with each other so as not to interfere with the detection light SL.

As illustrated in FIG. 10, the lateral width of the flat plate portion 60a is formed to be slightly narrower than the lateral width of the main body case 10 and the cover member 20. Further, as illustrated in FIG. 11, a lower edge of the flat plate portion 60a protrudes downward from the lower edges of the main body case 10 and the cover member 20, and a finger hook portion 67 is formed.

On the surface of the flat plate portion 60a, a projection portion 66 made by carving an arrow indicating a sliding operation direction of the holding member 60 and guide letters are formed. The frictional coefficient of the surface of the flat plate portion 60a is increased by the projection portion 66.

Next, the operation of the liquid sensor of the embodiment will be described.

FIG. 12 illustrates a procedure for attaching the tube T to the liquid sensor. As illustrated in FIG. 12(a), the liquid sensor with the cover member 20 attached to the main body case 10 is first attached to the attachment surface. Next, as illustrated in FIG. 12(b), the tube T is fitted to the holding piece 61 of the holding member 60.

Next, as illustrated in FIG. 12(c), the tube T is fitted to the elastic pieces 51A and 51B of the cover member 20 at a position lower than the attachment position of the holding member 60 with respect to the tube T.

In addition, as illustrated in FIG. 12(d), the fitting pieces 62A and 62B of the holding member 60 are fitted and inserted into the fitting recess portion 63 of the cover member 20 from above and fits the protrusion portion 65 of the elastic piece 64 to the locking groove 56 of the cover member 20. Then, the holding member 60 is positioned in the vertical direction with respect to the cover member 20.

In this state, in the holding member 60, the fitting pieces 62A and 62B are fitted to the fitting recess portion 63, and the holding member 60 is prevented from coming off to the front of the body member case 10. Therefore, the tube T is stably held to the cover member 20 in a state of being held by the elastic pieces 51A and 51B and the holding piece 61.

Further, in a case of detaching the holding member 60 from the cover member 20, the holding member 60 may slide upward by pressing the finger hook portion 67 from below or by pressing a fingertip against the projection portion 66.

When the tube T is held by the elastic pieces 51A and 51B, by receiving the detection light SL output from the light projecting element 37 with the light receiving element 38, it is detected whether or not the liquid L normally flows in the tube T.

In the above-described liquid sensor, the following effects can be obtained.

(1) In a state where the tube T is held by the elastic pieces 51A and 51B of the cover member 20, it is possible to detect whether or not the liquid L normally flows in the tube T.

(2) With the elastic pieces 51A and 51B of the cover member 20 and the holding piece 61 of the holding member 60, it is possible to stably hold the tube T without using screws.

(3) Since the holding member 60 can be fitted and inserted into the cover member 20 only from above, it is possible to prevent the holding member 60 from coming off from the front (the direction perpendicular to the longitudinal direction of the tube) by pulling force that acts on the tube T. Therefore, it is possible to stably detect whether or not the liquid L normally flows in the tube T. In addition, the holding member 60 may be fittable and insertable into the cover member 20 only obliquely from above. In short, the direction may be a direction that is not identical with the insertion and extraction direction of the tube T.

(4) The fitting pieces 62A and 62B of the holding member 60 can be fitted and inserted only from above into the fitting recess portion 63 formed between the elastic pieces 51A and 51B of the cover member 20 and the side surface of the recessed groove 50. In addition, since the cross-sectional shape of the fitting recess portion 63 is a shape in which the width of the deepest portion thereof is formed to be widened and the fitting recess portion 63 is filled with the fitting pieces 62A and 62B, it is possible to prevent the holding member 60 from coming off to the front from the cover member 20.

(5) Since the fitting pieces 62A and 62B have a shape that fills the fitting recess portion 63, in a state where the holding member 60 is attached to the cover member 20, it is possible to prevent the elastic deformation of the elastic pieces 51A and 51B in a diameter expansion direction. Therefore, it is possible to prevent the tube T from coming off from the elastic pieces 51A and 51B.

(6) Since the fitting recess portion 63 utilized the space formed between the elastic pieces 51A and 51B and the recessed groove 50, it is not necessary to additionally provide a fitting recess portion for fitting and inserting the fitting pieces 62A and 62B into the cover member 20.

(7) The holding member 60 can be easily attached to the cover member 20 without using screws.

(8) When the protrusion portion 65 of the holding member 60 is engaged with the locking groove 56 of the cover member 20, the holding member 60 can be easily positioned in the vertical direction with respect to the cover member 20 at a position where the fitting pieces 62A and 62B do not block the detection light SL.

(9) It is possible to easily perform the sliding operation of the holding member 60 in the vertical direction with respect to the cover member 20 by the finger hook portion 67 or the projection portion 66.

(10) Since the width of the holding member 60 is narrower than the width of the main body case 10 and the cover member 20 and the holding member 60 does not protrude from the side surfaces of the main body case 10 and the cover member 20, it is possible to prevent unnecessary hooking on surrounding articles around the main body case 10.

(11) Since the holding member 60 can be held on the tube T by the holding piece 61, even when the holding member 60 is detached from the cover member 20, the holding member 60 is held on the tube T. Therefore, it is possible to prevent the holding member 60 from dropping out from the tube T or being lost.

In addition, the above-described embodiment may be changed as follows.

The fitting recess portion into which the fitting piece of the holding member can be fitted and inserted along the longitudinal direction of the tube may be provided at an arbitrary position of the main body case.

While the invention has been described in detail and with reference to specific embodiments, it will be apparent to those skilled in the art that various changes or modifications can be made without departing from the spirit and scope of the invention.

The present application is based on Japanese Patent Application (No. 2016-108479) filed on May 31, 2016, and the content thereof is incorporated herein by reference.

DESCRIPTION OF REFERENCE SIGN(S)

10: Main Body Case
37: Light Projecting Unit (Light Projecting Element)
38: Light Receiving Unit (Light Receiving Element)
51A, 51B: Elastic Piece
56: Positioning Means (Locking Groove)
60: Holding Member
61: Holding Piece
62A, 62B: Fitting Piece
63: Fitting Recess Portion
65: Positioning Means (Protrusion Portion)
66: Projection Portion
67: Finger Hook Portion
T: Tube
L: Liquid

The invention claimed is:

1. A liquid sensor configured to detect presence or absence of a liquid in a tube having a light-transmitting property, the liquid sensor comprising:
a main body case comprising:
an elastic piece configured to hold the tube such that the tube is allowed to be inserted therein and extracted therefrom in a direction perpendicular to a longitudinal direction of the tube;
a light projecting unit configured to irradiate the tube with detection light; and
a light receiving unit configured to receive the detection light that has passed through the tube, wherein
a holding member configured to cover the tube in an insertion and extraction direction of the tube is attachable to and detachable from the main body case only in a direction that is not identical with the insertion and extraction direction,
the elastic piece allows the tube to be elastically inserting therein and extracting therefrom in the direction perpendicular to the longitudinal direction of the tube, and forms a fitting recess portion between the main body case and the elastic piece,
the holding member comprises a fitting piece that is capable of attaching and detaching the holding member to and from the fitting recess portion only in a direction along the longitudinal direction of the tube, and
the fitting recess portion has a width of a depth portion in the insertion and extraction direction of the tube wider than that of an intermediate portion, and a lateral cross-sectional shape of the fitting piece is a shape that is the same as a sectional shape of the fitting recess portion, whereby insertion and extraction is allowed only in the direction along the longitudinal direction of the tube.

2. The liquid sensor according to claim 1, wherein a holding piece configured to elastically hold the tube is provided in the holding member.

3. The liquid sensor according to claim 1, wherein the holding member comprises a positioning mechanism configured to be elastically engaged with the main body case to position the holding member in the longitudinal direction of the tube.

4. The liquid sensor according to claim 3, wherein the holding member comprises a finger hook portion that protrudes to one side than the main body case in a state in which the holding member is positioned in the main body case.

5. The liquid sensor according to claim 3, wherein the holding member has a lateral width so as not to protrude from a side surface of the main body case.

6. The liquid sensor according to claim 3, wherein a surface of the holding member comprises a projection portion configured to increase a friction coefficient of the surface.

7. A tube holding member of a liquid sensor configured to detect presence or absence of a liquid in a tube having a light-transmitting property, the tube holding member comprising:
a holding member including a fitting piece that is capable of attaching and detaching the holding member to and from a fitting recess portion of a main body case of the liquid sensor only in a direction along a longitudinal direction of the tube, the holding member being configured to
hold the tube at a detection position to be insertable to and extractable from the main body case of the liquid sensor by an elastic piece that has an opening that is smaller than a diameter of the tube, and
cover the tube in an insertion and extraction direction of the tube, wherein
the holding member is attachable to and detachable from the main body case only in a direction that is not identical with the insertion and extraction direction of the tube with respect to the main body case,
the elastic piece is configured to allow the tube to be elastically inserted therein and extracted therefrom in the direction perpendicular to the longitudinal direction of the tube, and to form a fitting recess portion between the main body case and the elastic piece, and
the fitting recess portion has a width of a deepest portion in the insertion and extraction direction of the tube wider than that of an intermediate portion, and a lateral cross-sectional shape of the fitting piece is a shape that is the same as a sectional shape of the fitting recess portion, whereby insertion and extraction is allowed only in the direction along the longitudinal direction of the tube.

* * * * *